United States Patent
Passerini et al.

(10) Patent No.: US 7,536,583 B2
(45) Date of Patent: May 19, 2009

(54) TECHNIQUE FOR TIMELINE COMPRESSION IN A DATA STORE

(75) Inventors: Ronald Peter Passerini, Somerville, MA (US); Robert Warren Perry, Leominster, MA (US); Christopher Angelo Rocca, Burlington, MA (US); Michael Daniel Anthony, Wilmington, MA (US)

(73) Assignee: Symantec Operating Corporation, Cupertino, CA (US)

( * ) Notice: Subject to any disclaimer, the term of this patent is extended or adjusted under 35 U.S.C. 154(b) by 0 days.

(21) Appl. No.: 11/549,386

(22) Filed: Oct. 13, 2006

(65) Prior Publication Data

US 2007/0088973 A1    Apr. 19, 2007

Related U.S. Application Data

(60) Provisional application No. 60/726,187, filed on Oct. 14, 2005.

(51) Int. Cl.
*G06F 11/00* (2006.01)
(52) U.S. Cl. .......................................... 714/5; 711/161
(58) Field of Classification Search ................ 714/5–8, 714/15; 711/114, 161, 162; 707/202–204
See application file for complete search history.

(56) References Cited

U.S. PATENT DOCUMENTS

| | | | |
|---|---|---|---|
| 3,444,528 A | 5/1969 | Lovell et al. | |
| 3,533,082 A | 10/1970 | Schnabel et al. | |
| 3,715,729 A | 2/1973 | Mercy | |
| 4,141,066 A | 2/1979 | Keiles | |
| 4,156,907 A | 5/1979 | Rawlings et al. | |
| 4,164,017 A | 8/1979 | Randell et al. | |
| 4,191,996 A | 3/1980 | Chesley | |
| 4,351,023 A | 9/1982 | Richer | |
| 4,378,588 A | 3/1983 | Katzman et al. | |
| 4,403,303 A | 9/1983 | Howes et al. | |

(Continued)

FOREIGN PATENT DOCUMENTS

EP    1 091 229 A2    4/2001

(Continued)

OTHER PUBLICATIONS

Castelletto et al., "DB2 for VSE & VM Archiving and Recovery," IBM VSE/ESA, pp. 1, 3-9, 11-18 (1996).

(Continued)

*Primary Examiner*—Dieu-Minh Le
(74) *Attorney, Agent, or Firm*—Hunton & Williams LLP (57) ABSTRACT

A technique for timeline compression in a data store is disclosed. In one particular exemplary embodiment, the technique may be realized as a method for timeline compression in a storage system, wherein digital content of the storage system is backed up to enable restoration of the digital content to one or more points in a timeline. The method may comprise selecting a time interval in the timeline. The method may also comprise identifying one or more sets of backup data recorded for the selected time interval, wherein the identified one or more sets of backup data represent at least a portion of old data overwritten during the selected time interval. The method may further comprise discarding other backup data recorded for the selected time interval, thereby reducing a granularity level of the timeline in the selected time interval.

14 Claims, 6 Drawing Sheets

U.S. PATENT DOCUMENTS

| | | |
|---|---|---|
| 4,453,215 A | 6/1984 | Reid |
| 4,459,658 A | 7/1984 | Gabbe et al. |
| 4,479,214 A | 10/1984 | Ryan |
| 4,483,001 A | 11/1984 | Ryan |
| 4,484,275 A | 11/1984 | Katzman et al. |
| 4,486,826 A | 12/1984 | Wolff et al. |
| 4,498,145 A | 2/1985 | Baker et al. |
| 4,507,751 A | 3/1985 | Gawlick et al. |
| 4,521,847 A | 6/1985 | Ziehm et al. |
| 4,581,701 A | 4/1986 | Hess et al. |
| 4,607,365 A | 8/1986 | Greig et al. |
| 4,608,688 A | 8/1986 | Hansen et al. |
| 4,639,856 A | 1/1987 | Hrustich et al. |
| 4,648,031 A | 3/1987 | Jenner |
| 4,652,940 A | 3/1987 | Sumiyoshi |
| 4,654,819 A | 3/1987 | Stiffler et al. |
| 4,654,857 A | 3/1987 | Samson et al. |
| 4,674,038 A | 6/1987 | Brelsford et al. |
| 4,703,421 A | 10/1987 | Abrant et al. |
| 4,703,481 A | 10/1987 | Fremont |
| 4,713,811 A | 12/1987 | Frey |
| 4,727,516 A | 2/1988 | Yoshida et al. |
| 4,736,339 A | 4/1988 | Crabbe, Jr. |
| 4,750,177 A | 6/1988 | Hendrie et al. |
| 4,754,397 A | 6/1988 | Varaiya et al. |
| 4,814,971 A | 3/1989 | Thatte |
| 4,819,154 A | 4/1989 | Stiffler et al. |
| 4,878,167 A | 10/1989 | Kapulka et al. |
| 4,959,774 A | 9/1990 | Davis |
| 5,089,958 A | 2/1992 | Horton et al. |
| 5,201,044 A | 4/1993 | Frey, Jr. et al. |
| 5,212,784 A | 5/1993 | Sparks |
| 5,235,601 A | 8/1993 | Stallmo et al. |
| 5,241,670 A | 8/1993 | Eastridge et al. |
| 5,255,270 A | 10/1993 | Yanai et al. |
| 5,269,022 A | 12/1993 | Shinjo et al. |
| 5,280,611 A | 1/1994 | Mohan et al. |
| 5,287,501 A | 2/1994 | Lomet |
| 5,297,258 A | 3/1994 | Hale et al. |
| 5,325,519 A | 6/1994 | Long et al. |
| 5,331,646 A | 7/1994 | Krueger et al. |
| 5,339,406 A | 8/1994 | Carney et al. |
| 5,357,509 A | 10/1994 | Ohizumi |
| 5,375,232 A * | 12/1994 | Legvold et al. ............. 711/162 |
| 5,381,545 A | 1/1995 | Baker et al. |
| 5,404,361 A | 4/1995 | Casorso et al. |
| 5,404,508 A | 4/1995 | Konrad et al. |
| 5,440,735 A | 8/1995 | Goldring |
| 5,450,546 A | 9/1995 | Krakirian |
| 5,469,573 A | 11/1995 | McGill, III et al. |
| 5,479,654 A | 12/1995 | Squibb |
| 5,483,468 A | 1/1996 | Chen et al. |
| 5,487,160 A | 1/1996 | Bemis |
| 5,497,483 A * | 3/1996 | Beardsley et al. ............. 714/1 |
| 5,524,205 A | 6/1996 | Lomet et al. |
| 5,530,846 A | 6/1996 | Strong |
| 5,535,188 A | 7/1996 | Dang et al. |
| 5,557,770 A | 9/1996 | Bhide et al. |
| 5,572,659 A | 11/1996 | Iwasa et al. |
| 5,592,648 A | 1/1997 | Schultz et al. |
| 5,598,528 A | 1/1997 | Larson et al. |
| 5,604,853 A | 2/1997 | Nagashima |
| 5,604,862 A | 2/1997 | Midgely et al. |
| 5,623,598 A | 4/1997 | Voigt et al. |
| 5,634,096 A | 5/1997 | Baylor et al. |
| 5,638,509 A | 6/1997 | Dunphy et al. |
| 5,640,561 A | 6/1997 | Satoh et al. |
| 5,649,152 A | 7/1997 | Ohran et al. |
| 5,659,747 A | 8/1997 | Nakajima |
| 5,677,952 A | 10/1997 | Blakley, III et al. |
| 5,715,438 A | 2/1998 | Silha |
| 5,717,849 A | 2/1998 | Brady |
| 5,724,501 A | 3/1998 | Dewey et al. |
| 5,729,719 A | 3/1998 | Gates |
| 5,729,743 A | 3/1998 | Squibb |
| 5,740,397 A | 4/1998 | Levy |
| 5,740,433 A | 4/1998 | Carr et al. |
| 5,742,792 A | 4/1998 | Yanai et al. |
| 5,745,906 A | 4/1998 | Squibb |
| 5,751,936 A | 5/1998 | Larson et al. |
| 5,751,939 A | 5/1998 | Stiffler |
| 5,758,057 A | 5/1998 | Baba et al. |
| 5,761,680 A | 6/1998 | Cohen et al. |
| 5,764,877 A | 6/1998 | Lomet et al. |
| 5,777,874 A | 7/1998 | Flood et al. |
| 5,778,392 A | 7/1998 | Stockman et al. |
| 5,787,243 A | 7/1998 | Stiffler |
| 5,790,773 A | 8/1998 | DeKoning et al. |
| 5,799,141 A | 8/1998 | Galipeau et al. |
| 5,802,264 A | 9/1998 | Chen et al. |
| 5,809,340 A | 9/1998 | Bertone et al. |
| 5,813,017 A | 9/1998 | Morris |
| 5,829,045 A | 10/1998 | Motoyama |
| 5,829,046 A | 10/1998 | Tzelnic et al. |
| 5,835,915 A | 11/1998 | Carr et al. |
| 5,835,953 A | 11/1998 | Ohran |
| 5,857,208 A | 1/1999 | Ofek |
| 5,864,657 A | 1/1999 | Stiffler |
| 5,893,119 A | 4/1999 | Squibb |
| 5,893,140 A | 4/1999 | Vahalia et al. |
| 5,907,685 A | 5/1999 | Douceur |
| 5,933,368 A | 8/1999 | Ma et al. |
| 5,948,110 A | 9/1999 | Hitz et al. |
| 5,961,613 A | 10/1999 | DeNicola |
| 5,982,886 A | 11/1999 | Itami et al. |
| 5,996,088 A | 11/1999 | Frank et al. |
| 6,000,020 A | 12/1999 | Chin et al. |
| 6,012,145 A | 1/2000 | Mathers et al. |
| 6,014,690 A | 1/2000 | VanDoren et al. |
| 6,016,553 A | 1/2000 | Schneider et al. |
| 6,018,746 A | 1/2000 | Hill et al. |
| 6,023,710 A | 2/2000 | Steiner et al. |
| 6,035,306 A | 3/2000 | Lowenthal et al. |
| 6,041,420 A | 3/2000 | Skarpelos et al. |
| 6,044,444 A | 3/2000 | Ofek |
| 6,054,987 A | 4/2000 | Richardson |
| 6,061,769 A | 5/2000 | Kapulka et al. |
| 6,061,770 A | 5/2000 | Franklin |
| 6,064,247 A | 5/2000 | Krakirian |
| 6,065,018 A | 5/2000 | Beier et al. |
| 6,078,990 A | 6/2000 | Frazier |
| 6,079,000 A | 6/2000 | Cooper et al. |
| 6,081,875 A | 6/2000 | Clifton et al. |
| 6,081,877 A | 6/2000 | Taki |
| 6,085,200 A | 7/2000 | Hill et al. |
| 6,122,664 A | 9/2000 | Boukobza et al. |
| 6,125,404 A | 9/2000 | Vaglica et al. |
| 6,131,148 A | 10/2000 | West et al. |
| 6,138,243 A | 10/2000 | Mealey et al. |
| 6,148,416 A | 11/2000 | Masubuchi |
| 6,158,019 A | 12/2000 | Squibb |
| 6,173,377 B1 | 1/2001 | Yanai et al. |
| 6,199,178 B1 | 3/2001 | Schneider et al. |
| 6,205,450 B1 | 3/2001 | Kanome et al. |
| 6,205,527 B1 | 3/2001 | Goshey et al. |
| 6,219,752 B1 | 4/2001 | Sekido et al. |
| 6,230,282 B1 | 5/2001 | Zhang |
| 6,240,527 B1 | 5/2001 | Schneider et al. |
| 6,243,105 B1 | 6/2001 | Hoyer et al. |
| 6,289,357 B1 | 9/2001 | Parker |
| 6,301,677 B1 | 10/2001 | Squibb |
| 6,311,193 B1 | 10/2001 | Sekido et al. |
| 6,324,548 B1 | 11/2001 | Sorenson |
| 6,345,346 B1 | 2/2002 | Biessener et al. |

| | | |
|---|---|---|
| 6,347,365 B1 | 2/2002 | Leshem et al. |
| 6,357,015 B1 | 3/2002 | Yamakawa et al. |
| 6,363,487 B1 | 3/2002 | Schneider |
| 6,366,987 B1 | 4/2002 | Tzelnic et al. |
| 6,369,820 B1 | 4/2002 | Bertram et al. |
| 6,374,363 B1 | 4/2002 | Wu et al. |
| 6,381,635 B1 | 4/2002 | Hoyer et al. |
| 6,385,707 B1 | 5/2002 | Maffezzoni |
| 6,430,577 B1 | 8/2002 | Hart |
| 6,434,681 B1 | 8/2002 | Armangau |
| 6,434,710 B1 | 8/2002 | Sato et al. |
| 6,446,090 B1 | 9/2002 | Hart |
| 6,477,629 B1 | 11/2002 | Goshey et al. |
| 6,499,034 B1 | 12/2002 | Mackinlay |
| 6,505,248 B1 | 1/2003 | Casper et al. |
| 6,513,065 B1 | 1/2003 | Hafez et al. |
| 6,532,535 B1 | 3/2003 | Maffezzoni et al. |
| 6,535,967 B1 | 3/2003 | Milillo et al. |
| 6,539,402 B1 | 3/2003 | Sorenson et al. |
| 6,542,975 B1 | 4/2003 | Evers et al. |
| 6,549,992 B1 | 4/2003 | Armangau et al. |
| 6,553,392 B1 | 4/2003 | Mosher, Jr. et al. |
| 6,557,089 B1 | 4/2003 | Reed et al. |
| 6,560,614 B1 | 5/2003 | Barboy et al. |
| 6,581,185 B1 | 6/2003 | Hughes |
| 6,594,744 B1 | 7/2003 | Humlicek et al. |
| 6,618,794 B1 | 9/2003 | Sicola et al. |
| 6,622,263 B1 | 9/2003 | Stiffler et al. |
| 6,625,623 B1 | 9/2003 | Midgley et al. |
| 6,643,671 B2 | 11/2003 | Milillo et al. |
| 6,651,075 B1 | 11/2003 | Kusters et al. |
| 6,664,964 B1 | 12/2003 | Levin-Michael et al. |
| 6,665,779 B1 | 12/2003 | Berhan et al. |
| 6,667,743 B2 | 12/2003 | Bertram et al. |
| 6,684,229 B1 | 1/2004 | Luong et al. |
| 6,687,322 B1 | 2/2004 | Zhang et al. |
| 6,691,245 B1 | 2/2004 | DeKoning |
| 6,694,413 B1 | 2/2004 | Mimatsu et al. |
| 6,701,456 B1 | 3/2004 | Biessener |
| 6,704,730 B2 | 3/2004 | Moulton et al. |
| 6,711,572 B2 | 3/2004 | Zakharov et al. |
| 6,711,693 B1 | 3/2004 | Golden et al. |
| 6,725,898 B2 | 4/2004 | Mullet et al. |
| 6,728,898 B2 | 4/2004 | Tremblay et al. |
| 6,732,125 B1 | 5/2004 | Autrey et al. |
| 6,732,171 B2 | 5/2004 | Hayden |
| 6,732,293 B1 | 5/2004 | Schneider |
| 6,907,505 B2 | 6/2005 | Cochran et al. |
| 6,975,963 B2 | 12/2005 | Hamilton et al. |
| 6,981,114 B1 | 12/2005 | Wu et al. |
| 6,983,352 B2 | 1/2006 | Keohane et al. |
| 7,100,072 B2 * | 8/2006 | Galipeau et al. ............... 714/6 |
| 2001/0013100 A1 | 8/2001 | Doblar et al. |
| 2001/0034737 A1 | 10/2001 | Cane et al. |
| 2001/0056438 A1 | 12/2001 | Ito |
| 2002/0010872 A1 | 1/2002 | Van Doren et al. |
| 2002/0023199 A1 | 2/2002 | Biessener et al. |
| 2002/0049883 A1 | 4/2002 | Schneider et al. |
| 2002/0049950 A1 | 4/2002 | Loaiza et al. |
| 2002/0103982 A1 | 8/2002 | Ballard et al. |
| 2002/0133512 A1 | 9/2002 | Milillo et al. |
| 2002/0144044 A1 | 10/2002 | Moon et al. |
| 2002/0156971 A1 | 10/2002 | Jones et al. |
| 2002/0199073 A1 | 12/2002 | Tamura et al. |
| 2003/0006988 A1 | 1/2003 | Alford, Jr. et al. |
| 2003/0014605 A1 | 1/2003 | Slater et al. |
| 2003/0018657 A1 | 1/2003 | Monday |
| 2003/0028726 A1 | 2/2003 | Gaetner et al. |
| 2003/0051109 A1 | 3/2003 | Cochran |
| 2003/0056136 A1 | 3/2003 | Aweya et al. |
| 2003/0061331 A1 | 3/2003 | Nakamura et al. |
| 2003/0061456 A1 | 3/2003 | Ofek et al. |
| 2003/0088807 A1 | 5/2003 | Mathiske et al. |
| 2003/0093444 A1 | 5/2003 | Huxoll |
| 2003/0115432 A1 | 6/2003 | Biessener et al. |
| 2003/0126387 A1 | 7/2003 | Watanabe |
| 2003/0140070 A1 | 7/2003 | Kaczmarski et al. |
| 2003/0140209 A1 | 7/2003 | Testardi |
| 2003/0167380 A1 | 9/2003 | Green et al. |
| 2003/0177321 A1 | 9/2003 | Watanabe |
| 2003/0191829 A1 | 10/2003 | Masters et al. |
| 2003/0204700 A1 | 10/2003 | Biessener et al. |
| 2003/0225884 A1 | 12/2003 | Hayden |
| 2004/0030951 A1 | 2/2004 | Armangau |
| 2004/0064293 A1 * | 4/2004 | Hamilton et al. ............ 702/182 |
| 2004/0117572 A1 | 6/2004 | Welsh et al. |
| 2004/0139128 A1 | 7/2004 | Becker et al. |
| 2005/0251540 A1 | 11/2005 | Sim-Tang |
| 2005/0262097 A1 | 11/2005 | Sim-Tang et al. |
| 2005/0262377 A1 | 11/2005 | Sim-Tang |
| 2006/0101384 A1 | 5/2006 | Sim-Tang et al. |

FOREIGN PATENT DOCUMENTS

| | | |
|---|---|---|
| EP | 0 751 462 B1 | 7/2002 |
| EP | 1 522 926 | 4/2005 |
| WO | 91/01026 | 1/1991 |
| WO | 96/12232 | 4/1996 |
| WO | 99/12101 | 3/1999 |
| WO | 00/65447 | 11/2000 |
| WO | 01/04801 A1 | 1/2001 |
| WO | 01/33357 A1 | 5/2001 |
| WO | 03/007148 A1 | 1/2003 |

OTHER PUBLICATIONS

Castelletto et al., "DB2 for VSE & VM Archiving and Recovery," [formerly online], (1996) [retrieved on Oct. 26, 2004]. Retrieved from the Internet: <URL: http://web.archive.org/web/19990222065151/http://www.s390.ibm.com.vse/vsehtmls/vse8arc.htm>.

"Commands for Optical Memory Block Devices." in T10, *Information Technology—SCSI-3 Block Commands* (Nov. 13, 1997) (pp. 72-73).

Flaviu, C. and Fetzer, C. *Probabilistic Internal Clock Synchronization*,, California (May 1, 2003), pp. 1-33.

Green, R.J. et al., "Designing a Fast, On-line Backup System for a Log-Structured File System," Digital Technical Journal, vol. 8, No. 2, 1996, pp. 32-45.

Hultgren, C.D., "Fault-tolerant Personal Computers Safeguard Critical Applications," I&CS Instruments and Control Systems, vol. 65, No. 9, Radnor, PA, US, pp. 23-28 (Sep. 1992).

International Search Report of PCT/US98/18863; completed Feb. 2, 1999.

International Search Report of PCT/US00/10999; completed Aug. 25, 2000.

*Proven Technology and Industry Leadership* [online], (2004) [retrieved on Aug. 23, 2004]. Retrieved from the Internet:<URL: http://www.mendocinosoft.com/pages.company.html>.

*RealTime—Near-Instant Recovery to Any Point in Time* [online] (2004). [retrieved on Aug. 23, 2004]. Retrieved from the Internet:<URL: http://www.mendocinosoft.com/pages.products.htm>.

Robinson, J.T., Analysis of Steady-State Segment Storage Utilizations in a Log-Structured File System with Least-Utilized Segment Cleaning, IBM Research Division, T.J. Watson Research Center, Oct. 1996, pp. 29-32.

Rodriguez-Rivera et al., "A Non-Fragmenting Non-Moving, Garbage Collector," from Proceedings of the International Symposium on Memory Management, Vancouver, Canada, Oct. 17-19, 1998, pp. 79-85, especially Figure 3 and pp. 82-83.

Shread, P. *The Big Blackout, a Year Later*, [online], (Aug. 13, 2004) [retrieved on Aug. 23, 2004]. Retrieved from the Internet:<URL: http://www.internetnews.com/storage/article.php/3394821>.

*Time-Slider Technology Blends Recovery Point and Time Objective* [online], (2004) [Retrieved on Aug. 23, 2004]. Retrieved from the Internet:<URL: http://www.mendocinosoft.com/pages/Time%Slider.htm>.

Topio, Inc., *Business Solutions: Enterprise Backup Consolidation* [pdf online], (2003) [retrieved on Aug. 23, 2004]. Retrieved from the Internet:<URL: http://www.topio.com/product/pdf/EBC.pdf>.

Topio, Inc., *Business Solutions: Heterogeneous Disaster Recovery* [pdf online], (2003) [retrieved on Aug. 23, 2004]. Retrieved from the Internet:<URL: http://www.topio.com/product/pdf/HDR.pdf>.

Topio, Inc., *Business Solutions: Replicated Storage Services* [pdf online], (2003) [retrieved on Aug. 23, 2004]. Retrieved from the Internet:<URL: http://www.topio.com/product/pdf/RSS.pdf>.

Topio, Inc., *Enterprise Data Recoverability* [pdf online], (Nov. 2003) [retrieved on Aug. 23, 2004]. Retrieved from the Internet:<URL: http://www.topio.com/product/pdf/EDR.pdf>.

Topio, Inc., *Topio Corporate Summary* [pdf online], (2003) [retrieved on Aug. 23, 2004]. Retrieved from the Internet:<URL: http://www.topio.com/product/pdf/TCS.pdf>.

Topio, Inc., *Topio Data Protection Suite: Enterprise Data Recoverability* [pdf data sheet online], (Nov. 2003) [retrieved on Aug. 23, 2004]. Retrieved from the Internet:<URL: http://www.topio.com/product/pdf/ TDPS.pdf>.

Topio, Inc., *Topio Data Protection Suite: Enterprise Data Recoverability* [pdf online], (Nov. 2003) [retrieved on Aug. 23, 2004]. Retrieved from the Internet:<URL: http://www.topio.com/product/pdf/ BWP1.pdf>.

Topio, Inc., *Topio Data Protection Suite: Technical Overview* [pdf online], (Nov. 2003) [retrieved on Aug. 23, 2004]. Retrieved from the Internet:<URL: http://www.topio.com/product/pdf/TTO.pdf>.

*Topio™ Delivers New Advances in Continuous Data Protection Solutions for Enterprise Disaster Recovery* [online press release], (Apr. 5, 2004) [retrieved on Aug. 23, 2004]. Retrieved from the Internet:<URL: http://www.topio.com/news/pr_04.05.04.html>.

*Topio™ to Demo Continuous Data Protection Solutions at International DB2 Users Group Show*, [online press release], (May 10, 2004) [retrieved on Aug. 23, 2004]. Retrieved from the Internet:<URL: http://www.topio.com/news/pr_05.10.04.html>.

Wild Fire, Inc. *User's Guide: GoBack™ by Wild Fire, Version 2.1.* Minnesota. 1998.

Wild Fire, Inc. *User's Guide Addendum: GoBack™ by Wild Fire, Version 2.1d.* Minnesota. 1999.

XOSoft, Inc., *Company Overview* [online], (2003) [retrieved on Aug. 23, 2004]. Retrieved from the Internet:<URL: http://www.xosoft.com/company/index.shtml>.

XOSoft, Inc., *Data Rewinder™ Product Suite* [online], (2003) [retrieved on Aug. 23, 2004]. Retrieved from the Internet:<URL: http://www.xosoft.com/products/f_Rewinder.shtml>.

XOSoft, Inc., *WANSync Product Suite* [online], (2003) [retrieved on Aug. 23, 2004]. Retrieved from the Internet:<URL: http://www.xosoft.com/products/f_WANSync.shtml>.

XOSoft, Inc., WANSync[HA] Product Suite [online], (2003) [retrieved on Aug. 23, 2004]. Retrieved from the Internet:<URL: http://www.xosoft.com/products/f_WANSyncHA.shtml>.

Vyant Technologies, Inc. *RealTime™* [homepage online], (Sep. 25, 2002) [retrieved on Nov. 22, 2004]. Retrieved from the Internet: <URL: http://www.archive.org/web/20020925205451/http:vyant-tech.com>.

Vyant Technologies, Inc. *Real Time™* [white paper online], (2002) [retrieved on Nov. 22, 2004]. Retrieved from the Internet: <URL: http://www.archive.org/web/20030315044353/http:vyanttech.com/assets/documents/realtime_white_paper.pdf>.

Daniel Gilly and the staff of O'Reilly & Associates, Inc. UNIX in a Nutshell, Aug. 1994, Systems V Edition, pp. 2-10 and 2-47 to 2-50.

Extended European Search Report in European Application No. 06816785.7, dated Mar. 4, 2009.

* cited by examiner

TECHNIQUE FOR TIMELINE COMPRESSION IN A DATA STORE

CROSS-REFERENCE TO RELATED APPLICATIONS

This patent application claims priority to U.S. Provisional Patent Application No. 60/726,187, filed Oct. 14, 2005, which is hereby incorporated by reference herein in its entirety.

This patent application is related to U.S. patent application Ser. No. 10/924,652, filed Aug. 24, 2004, which is a continuation-in-part of U.S. patent application Ser. No. 10/668,833, filed Sep. 23, 2003, each of which is hereby incorporated by reference herein in its entirety.

FIELD OF THE DISCLOSURE

The present disclosure relates generally to data storage and, more particularly, to a technique for timeline compression in a data store.

BACKGROUND OF THE DISCLOSURE

In related U.S. patent application Ser. No. 10/924,652 and U.S. patent application Ser. No. 10/668,833, a time-dependent data storage and recovery technique is disclosed. Embodiments of such a technique provide a solution for continuous data protection (CDP) wherein write commands directed to a storage system are intercepted by a storage management system having a current store and a time store. The current store may maintain or have access to a current (or mirror) copy of the storage system's digital content. The time store may record information associated with each intercepted write command, such as new data in the write command's payload or old data to be overwritten in the current store in response to the write command. Recordation of the new or old data in response to a write command may be referred to as a copy-on-write (COW) operation, and the new or old data recorded may be referred to as COW data. The time store may also record other information (i.e., metadata) associated with an intercepted write command and/or the corresponding COW operation, such as, for example, a timestamp, an original location in the current store where the old data are overwritten, and a destination location in the time store to which the COW data are copied. Each COW operation typically backs up one or more blocks of COW data, thereby creating one set of COW data and corresponding metadata. Over a period of time, multiple sets of COW data and corresponding metadata (including timestamps) may be accumulated as a collection of historical records of what have been written or overwritten in the current store or the storage system. The content of the time store may be indexed based on the metadata to facilitate efficient access to the COW data.

With a current copy of the storage system's digital content in the current store and the historical records in the time store, the storage management system adds a new dimension, i.e., time, to the storage system. Assuming the storage management system has been operatively coupled to the storage system since a past time, the storage management system may quickly and accurately restore any addressable content in the storage system to any point in time between the past time and a present time.

Ideally, it might be desirable to maintain such a data recovery capability for as long a timeline as possible. However, to accommodate an extended timeline, a significant amount of storage space is needed to store the COW data and corresponding metadata for every write command in that timeline. Even more storage space is needed if the storage system sees a relatively high write rate (i.e., number of write operations per unit time). One temporary solution may be to simply increase storage capacity of the time store. However, apart from a higher cost, a simple storage increase may not scale well with the rest of the system and tends to create a deluge of other problems, such as a performance degradation due to difficulties of parsing through an additional amount of data. Without an infinite storage capacity, most storage systems have to settle for the reality that only a finite length of timeline (e.g., ten days or two weeks) can be maintained. In conventional data protection systems, it is typical to keep a few days' worth of backup data and completely discard the backup data that are more than a few days old. In these systems, data recovery capabilities are limited to the past few days for which backup data are available. Alternatively, the backup data that are more than a few days old may be moved off site on a regular basis. Such a brute-force solution can be costly and disruptive, not to mention its slow response to data recovery requests where off-site data are needed.

In view of the foregoing, it would be desirable to provide a solution for data storage management which overcomes the above-described inadequacies and shortcomings.

SUMMARY OF THE DISCLOSURE

A technique for timeline compression in a data store is disclosed. In one particular exemplary embodiment, the technique may be realized as a method for timeline compression in a storage system, wherein digital content of the storage system is backed up to enable restoration of the digital content to one or more points in a timeline. The method may comprise selecting a time interval in the timeline. The method may also comprise identifying one or more sets of backup data recorded for the selected time interval, wherein the identified one or more sets of backup data represent at least a portion of old data overwritten during the selected time interval. The method may further comprise discarding other backup data recorded for the selected time interval, thereby reducing a granularity level of the timeline in the selected time interval.

In accordance with other aspects of this particular exemplary embodiment, the digital content of the storage system may be backed up through copy-on-write operations into a plurality of sets of copy-on-write data and corresponding metadata, and the step of identifying may further comprise identifying one or more sets of copy-on-write data and corresponding metadata recorded for the selected time interval.

In accordance with further aspects of this particular exemplary embodiment, a length of the time interval may be selected based at least in part on a desired granularity level of the timeline.

In accordance with additional aspects of this particular exemplary embodiment, the step of identifying may further comprise: determining whether a storage unit in the storage system has been overwritten more than once during the selected time interval; if the storage unit has been overwritten once during the selected time interval causing a sole set of copy-on-write data and corresponding metadata to be recorded, selecting the sole set; and if the storage unit has been overwritten more than once during the selected time interval causing multiple sets of copy-on-write data and corresponding metadata to be recorded, selecting one of the multiple sets.

In accordance with another aspect of this particular exemplary embodiment, if the storage unit has been overwritten more than once during the selected time interval, the selected set of copy-on-write data and corresponding metadata may be the earliest set recorded for the selected time interval.

In accordance with yet another aspect of this particular exemplary embodiment, the method may further comprise coalescing metadata in the one or more identified sets of copy-on-write data and corresponding metadata.

In accordance with still another aspect of this particular exemplary embodiment, the method may further comprise: identifying copy-on-write data that correspond to the coalesced metadata; and replacing all sets of copy-on-write data and corresponding metadata previously recorded for the selected time interval with a new set comprising the identified copy-on-write data and the coalesced metadata.

In accordance with a further aspect of this particular exemplary embodiment, the method may further comprise: selecting multiple time intervals in a portion of the timeline based on a desired granularity level for the portion of the timeline; and repeating the steps of identifying and discarding for the selected multiple time intervals.

In accordance with a yet further aspect of this particular exemplary embodiment, the storage system may comprise a plurality of storage devices and the method may further comprise: repeating the steps of identifying and discarding for one or more of the plurality of storage devices to cause the plurality of storage devices to have a consistent granularity level of the timeline with respect to one another.

In accordance with a still further aspect of this particular exemplary embodiment, the steps of selecting, identifying and discarding may be triggered when one or more of the following conditions are met: a predetermined storage capacity for the timeline has been consumed; a predetermined amount of data have been accumulated for a granularity level of the timeline; granularity levels of the timeline for at least two storage devices in the storage system are inconsistent; an instruction to reduce the granularity of the timeline is received; and a scheduled time for reducing the granularity of the timeline is reached.

In accordance with another aspect of this particular exemplary embodiment, the method may further comprise scanning the storage system for a storage device for which the granularity of the timeline can be reduced.

In another particular exemplary embodiment, the techniques may be realized as at least one signal embodied in at least one carrier wave for transmitting a computer program of instructions configured to be readable by at least one processor for instructing the at least one processor to execute a computer process for performing the method as recited above.

In yet another particular exemplary embodiment, the techniques may be realized as at least one processor readable medium for storing a computer program of instructions configured to be readable by at least one processor for instructing the at least one processor to execute a computer process for performing the method as recited above.

In still another particular exemplary embodiment, the techniques may be realized as a system for timeline compression in a storage system, wherein digital content of the storage system is backed up to enable restoration of the digital content to one or more points in a timeline. The system may comprise means for selecting a time interval in the timeline. The system may also comprise means for identifying one or more sets of backup data recorded for the selected time interval, wherein the identified one or more sets of backup data represent at least a portion of old data overwritten during the selected time interval. The system may further comprise means for discarding other backup data recorded for the selected time interval, thereby reducing a granularity level of the timeline in the selected time interval.

In a further particular exemplary embodiment, the techniques may be realized as a system for timeline compression in a storage system, wherein digital content of the storage system is backed up to enable restoration of the digital content to one or more points in a timeline. The system may comprise a storage medium for storing instructions. The system may also comprise at least one processor for: selecting a time interval in the timeline; identifying one or more sets of backup data recorded for the selected time interval, wherein the identified one or more sets of backup data represent at least a portion of old data overwritten during the selected time interval; and discarding other backup data recorded for the selected time interval, thereby reducing a granularity level of the timeline in the selected time interval.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

As used herein, "backup data" refers generally to data that have been recorded and/or organized (or even re-organized) with a purpose of restoring or recovering digital content of a storage system.

"Copy-on-write data" (or "COW data") refers to substantive data (e.g., new data to be written or old data to be overwritten in response to a write command) that have been recorded in a copy-on-write operation. New data to be written in response to a write command are sometimes referred to as "after image data" or "after image," while old data to be overwritten in response to a write command are sometimes referred to as "before image data" or "before image." The copy-on-write operation may be an actual operation performed in response to an actual write command. Or, the copy-on-write operation may be a virtual operation that includes the collective effect of multiple copy-on-write operations that occur during a selected time interval.

"Corresponding metadata" refers to informational data (e.g., timestamps) regarding the associated COW data in a copy-on-write operation. Typically, one copy-on-write operation causes one set of COW data and corresponding metadata to be created. Despite their correlation, COW data and corresponding metadata may be stored in separate storage devices or segments. In a time store, COW data may be organized in one or more timestamped "data chunks."

"Raw data" refers to one or more sets of COW data and corresponding metadata that have been recorded in response to actual write commands and have not been coalesced or otherwise modified since their recordation. In some circumstances, "COW data" and "corresponding metadata" may refer to COW data and corresponding metadata, respectively, that have been coalesced, re-organized or otherwise modified in a timeline compression process, wherein a resulting set of COW data and corresponding metadata may be considered as originating from a virtual copy-on-write operation in response to one or more write commands during a selected time interval. In other words, "COW data" and "corresponding metadata" may sometimes refer to backup data that are not on the raw data level.

"Granularity level" of a timeline refers to a time scale (e.g., weekly, daily, hourly, by the second, or by the millisecond) with which digital content of a storage system can be restored to a point in the timeline. The granularity level of a timeline is typically determined by the specific mechanism employed to back up digital content, how complete backup data are kept, and how the backup data are organized.

A typical "storage system" may comprise one or more storage devices which may be physical, virtual or logical devices or a combination thereof. According to one embodiment, a storage system may comprise a storage area network (SAN) having one or more datasets, wherein each dataset may comprise one or more nodes, and wherein one or more logical units (LUs) may be coupled to each node. Hereinafter, for ease of illustration, the term "storage system" may refer to an entire storage system or a portion (e.g., dataset or node) thereof. Typically, a timeline may be maintained for all LUs in a same dataset.

"Timeline storage" refers to a storage space for backup data in a time store. Timeline storage is typically organized in terms of quota groups, wherein each quota group allocates a predetermined storage space for a timeline associated with a corresponding dataset.

Embodiments of the present disclosure provide a technique known as "timeline compression" that allows a more extended timeline to be maintained for a storage system (or a dataset) without any substantial increase in timeline storage capacity or complete discarding of older backup data. This may be achieved by selectively decreasing a granularity level of the timeline as backup data are aging. One or more older portions of raw data backed up for a storage system may be coalesced and/or re-organized into one or more data chunks that reflect write operations in the storage system on a coarser level of granularity (e.g., hourly or daily) than the raw data normally would reflect. Such reduction in the granularity level of the timeline may offer a flexible, user-definable tradeoff wherein the timeline storage is economized without sacrificing older data entirely. As a result, a much longer timeline may be maintained for a storage system without any significant impact on its data protection or data recovery capabilities. The coalescence and/or re-organization process of backup data from one granularity level to another may be referred to as a "timeline rollup" or "rollup."

In the detailed description that follows, references will be made to embodiments of the time-dependent data storage and recovery technique as disclosed in U.S. patent application Ser. No. 10/924,652 and U.S. patent application Ser. No. 10/668,833. It should be appreciated that embodiments of the present disclosure are easily adaptable to other data protection methods or systems that maintain historical records of digital content of a storage system.

Figure 1A:
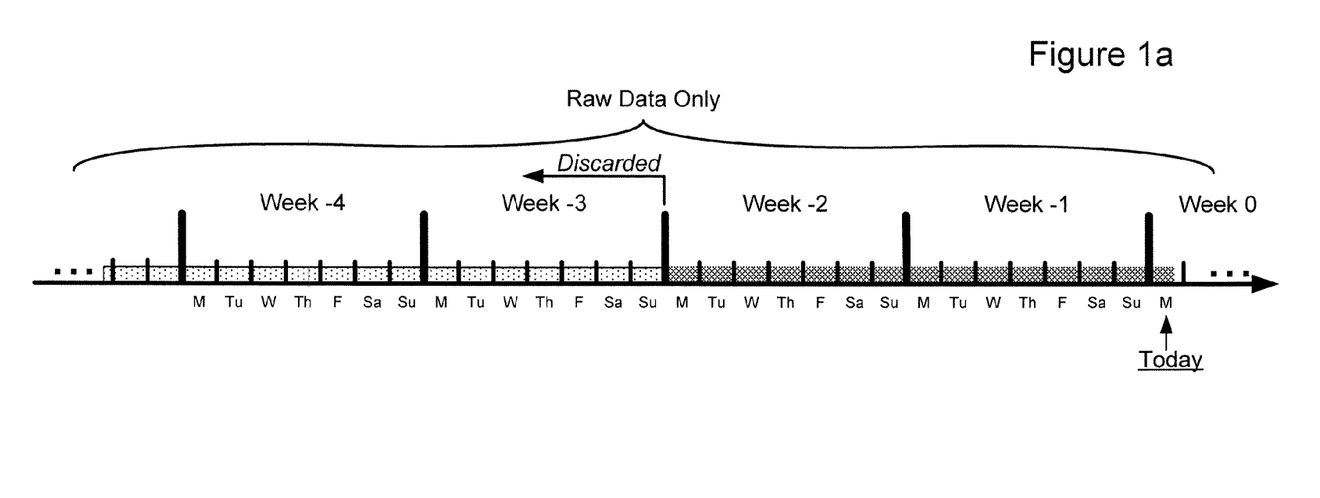
FIG. 1a shows a timeline maintained for a storage system based on a traditional method.

Referring to FIG. 1a, there is shown a timeline maintained for a storage system based on a traditional method. In this example, present day may be Monday of Week 0. The timeline may have been continuously maintained for a storage system for a few weeks (i.e., Week -1, Week -2, Week -3, Week -4 and so on). If several weeks' worth of backup data were all stored in the form of raw data, a large amount of storage space in a time store would be required. If, for example, there is only enough storage space to store fourteen days' worth of raw data, then, according to traditional approaches, those raw data that are more than fourteen days old must be completely discarded. That is, by the beginning of the present day (i.e., Monday of Week 0), all raw data recorded for Week -3 and earlier may have already been discarded. As the present day goes on and new raw data are accumulated, raw data recorded for Monday of Week -2 may have to be sacrificed in order to make room for the newly recorded raw data. Therefore, at any given time, digital content of the storage system is backed up only for the previous two weeks, while no historical record is available beyond that two-week period.

Figure 1B:
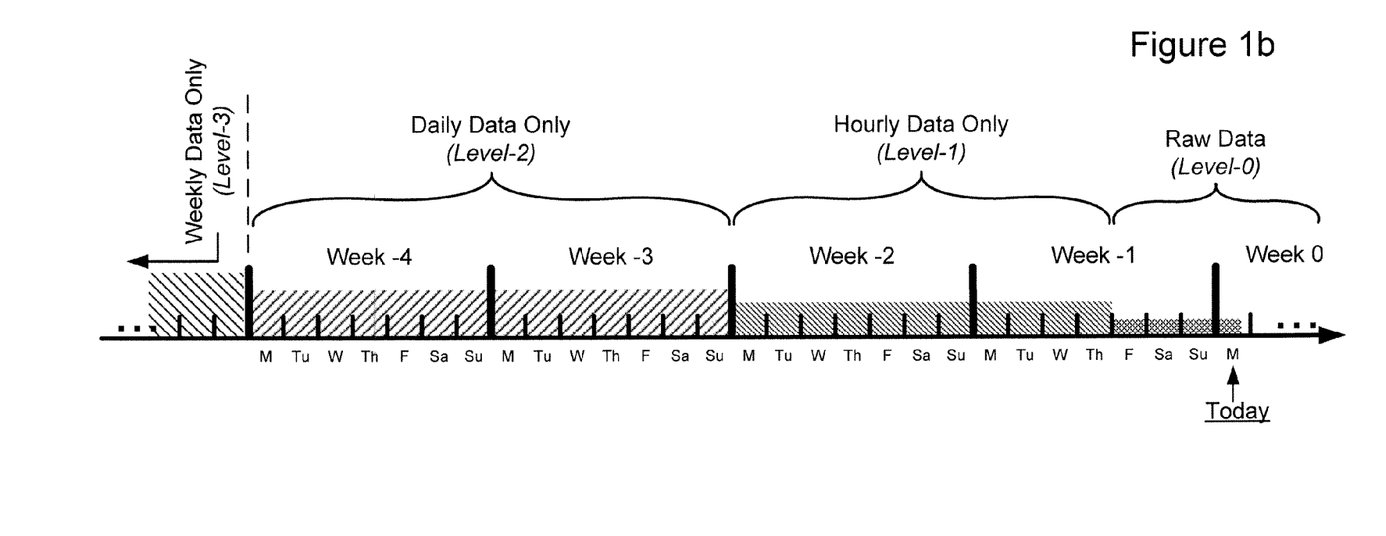
FIG. 1b shows a timeline maintained for a storage system in accordance with an embodiment of the present disclosure.

FIG. 1b shows a timeline maintained for a storage system in accordance with an embodiment of the present disclosure. This timeline may be generated by subjecting raw data to a timeline compression process that selectively reduces a granularity level of the timeline. It is recognized that, as time goes by, the oldest backup data are the least likely to be needed on the finest granularity level. Therefore, it might suffice to keep only a few days' worth of raw data in order to be able to restore the storage system to any point in time in the past few days. For older backup data, the granularity level of the timeline may be progressively reduced. As shown in FIG. 1b, on Monday of Week 0, for example, backup data for the past three days (i.e., Friday, Saturday and Sunday of Week -1) are kept in the form of raw data. In a second time period, that is, more than three days ago and up to the beginning of Week -2, for example, the backup data may be kept in the form of hourly data. That is, the original raw data may be selectively coalesced and/or discarded, as will be described in more detail below, such that only enough backup data is kept to be able to restore digital content of the storage system to any hour during the second time period. In a third time period that spans Week -3 and Week -4, for example, the backup data may be kept in the form of daily data. Prior to the beginning of Week -4, for example, only weekly data may be kept available. As a result of this exemplary timeline compression scheme, it may be possible to maintain a much longer timeline than the traditional approach illustrated in FIG. 1a. Even if there is only enough storage space for fourteen days' worth of raw data, a timeline much longer than two weeks, maybe a few months, may be maintained. As a result, digital content of the storage system that is several weeks old may still be restored. The only tradeoff is that such restoration of the older content may be available on a coarser level of granularity than what raw data can facilitate. For example, instead of being able to pick and choose a data recovery point by the second or by the millisecond, a user may only be able to select recovery points on an hourly, daily or weekly scale.

A timeline compression functionality in accordance with embodiments of the present disclosure may be implemented in any type of storage systems, preferably in connection with a storage management system having a current store and a time store. A set of parameters, known as Timeline Lifecycle Profile (TLP), may be configured by a user to control the timeline compression process. According to one embodiment, the TLP may specify four levels of backup data and a user configurable amount of time to keep each level of backup data before that level of backup data may be rolled up to a next level. The TLP may also specify a minimum amount of timeline storage used before a rollup takes place.

Referring again to FIG. 1b, the timeline illustrated therein reflects one exemplary TLP relating to four levels of backup data. Level-0 TLP may specify conditions that must be fulfilled before raw data can be rolled up to the next level. The conditions may be defined as an amount of raw data, in terms of time length and/or timeline storage capacity, to keep before some raw data may be rolled up to the next level. For example, the Level-0 TLP may require that at least 3 days' worth of raw data using 40% of the timeline storage capacity be accumulated before raw data older than 3 days or beyond the 40% storage limit may be rolled up to the next level. According to this configuration, even if there are more than 3 days of raw data, the raw data older than 3 days will not be rolled up until the raw data have also used up at least 40% of the timeline storage capacity. This configuration may also require that, even if 40% of the timeline storage capacity is occupied by raw data, a rollup is not performed unless more than 3 days' worth of raw data have been accumulated. In the Level-0 TLP, a default value for the time length may be infinite, which means that all other levels may be ignored and there will be no rollup of Level-0 raw data. A default limit for timeline storage capacity may be 0%, which means the amount of timeline storage in use will not be considered in determining whether to initiate a rollup of the raw data.

Level-1 TLP may specify a reduced granularity level (e.g., hourly) of the timeline compared with Level-0, as well as conditions that must be met before Level-1 data (e.g., hourly data) can be rolled up to the next level. Similar to Level-0 TLP, the conditions may be defined as an amount of Level-1 data, in terms of time length and/or timeline storage capacity, to keep before Level-1 data may be rolled up to the next level (e.g., as shown in FIG. 1b, 11 days' worth of hourly data using 20% of the timeline storage capacity). In the Level-1 TLP, a default value for the time length may be infinite, which means that all other levels may be ignored and rollups do not continue beyond Level-1 data. A default limit for timeline storage capacity may be 0%, which means the amount of timeline storage in use will not be considered in determining whether to initiate a rollup of the Level-1 data.

Level-2 TLP may specify a further reduced granularity level (e.g., daily) of the timeline as well as conditions that trigger a rollup of the Level-2 data. For example, the Level-2 TLP may require that at least 14 days' worth of daily data using 20% of the timeline storage capacity be accumulated before the older daily data may be rolled up to the next level.

Level-3 TLP may specify an even further reduced granularity level (e.g., weekly) of the timeline as well as conditions that trigger a rollup of the Level-3 data to the next level (e.g., monthly data). For example, the Level-3 TLP may require that at least 12 weeks' worth of weekly data using 10% of the timeline storage capacity be accumulated before the older weekly data may be rolled up to the next level.

According to embodiments of the present disclosure, a user typically does not explicitly create a TLP since a default TLP may already exist when a quota group is created in a storage system. Upon creation of the quota group, the user may have the option of modifying the default parameters of the TLP. Similarly, a user typically does not explicitly delete a TLP. The TLP may be deleted when the associated quota group is deleted. A user may modify a TLP in order to change the desired behavior of timeline compression. The TLP may be modified at any time without any immediate effect on the timeline. The default TLP, upon creation of a quota group, may specify that no rollups take place. A user may also modify a TLP when modifying attributes of a quota group. When an LU is added to a dataset, the LU may inherit an existing TLP for the corresponding quota group. The effect on the timeline may be that the start of the timeline may shift forward. This behavior may be the same as when there are no rollups defined. However, rollups may continue at the current rollup level for the entire dataset, and the new LU's current rollup state may be set to reflect that of the rest of the LUs in the dataset. When an LU is removed from a dataset, the start of remaining timeline may shift backward. This may be the same behavior exhibited when there are no rollups defined.

Figure 2:
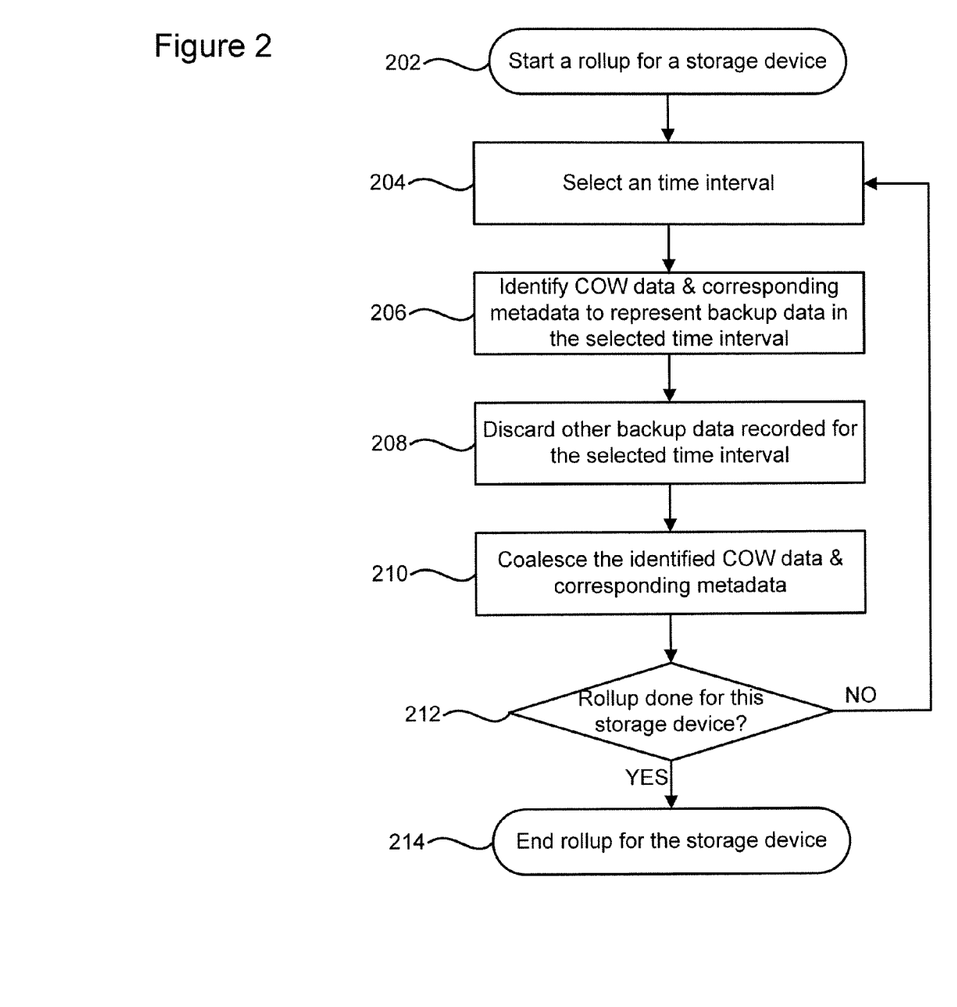
FIG. 2 shows a flow chart illustrating an exemplary timeline compression method in accordance with an embodiment of the present disclosure.

Referring to FIG. 2, there is shown a flow chart illustrating an exemplary timeline compression method in accordance with an embodiment of the present disclosure.

In step 202, a rollup may be started for a storage device in a storage system. The method steps in FIG. 2 illustrate a simplest rollup operation of backup data recorded for a portion of a timeline from one level to a next level, wherein it is assumed that the timeline is maintained for a particular storage device only. Timeline compression involving multiple storage devices will be described separately below.

In step 204, a time interval may be selected for a rollup operation. Selection of the time interval is typically based on conditions specified in the TLP. For example, if it is a rollup from raw data to hourly data, the time interval may be one hour long and selected from a portion of the timeline where hourly data are desired. This portion of the timeline may span multiple hours. Thus, the method steps 204 through 212 may be repeated for every hour in this portion of the timeline. Similarly, if it is a rollup from hourly data to daily data, the time interval may be 24 hours long and selected from a portion of the timeline where daily data are desired.

In step 206, COW data and corresponding metadata may be identified to represent backup data recorded for the selected time interval. For example, a unit of storage (e.g., a block) in the storage device may have been overwritten one or more times during the selected time interval. If a block has been overwritten only once during the selected time interval, the resultant set of COW data and corresponding metadata may be identified to represent backup data for this block. If a block has been overwritten multiple times during the selected time interval, a set of COW data and corresponding metadata that results from the earliest write operation may be identified to represent backup data for this block. Alternatively, a set of COW data and corresponding metadata that results from the latest write operation during the selected time interval may be identified. Additional or alternative criteria may be used to identify the representative backup data for the storage device during the selected time interval.

In step 208, other backup data that have been recorded for the selected time interval but are not selected in step 206 may be discarded or simply ignored. For example, metadata or other indexing data for the unselected backup data may be deleted or erased such that the unselected backup data are effectively deleted from the timeline.

In step 210, the COW data and corresponding metadata identified or selected in step 206 may be coalesced. According to one embodiment, these COW data and/or corresponding metadata are preferably coalesced into fixed size allocation units known as "buckets." For example when rolling up raw data into hourly data, one hour's worth of raw data may be coalesced into one 512 KB fixed-size hourly bucket. Later on, 24 hourly buckets of backup data may be coalesced into one 12 MB fixed-size daily bucket. Coalescence of the selected COW data and corresponding metadata may be carried out in a number of ways. According to one embodiment, the metadata for the selected time interval may be coalesced first. Then, the COW data (pointed to by the coalesced metadata) may be coalesced and copied into memory. The coalesced COW data may then be stored as new, higher level COW data for the selected time interval. Accordingly, the coalesced metadata may be modified and stored as corresponding metadata for the new COW data.

In step 212, it may be determined whether the rollup has been done for this storage device. If there are additional time intervals to roll up, the process may loop back to step 204 to repeat the coalescence of backup data until the rollup for all appropriate time intervals has been completed according to the requirements specified in the TLP. Then, in step 214, the rollup may end for this storage device. A timeline rollup operation may be configured (e.g., as a thread or sub-routine) to start or restart upon initiation by a user or upon triggering of one or more events defined in the TLP. For example, the rollup thread may be activated whenever a pre-determined percentage of the timeline storage has been used, before or after a deprecation of timeline, and/or on a periodic basis. A rollup thread may also be awoken when a second rollup thread on another node determines that it must rollup data for an LU on that node.

Figure 3:
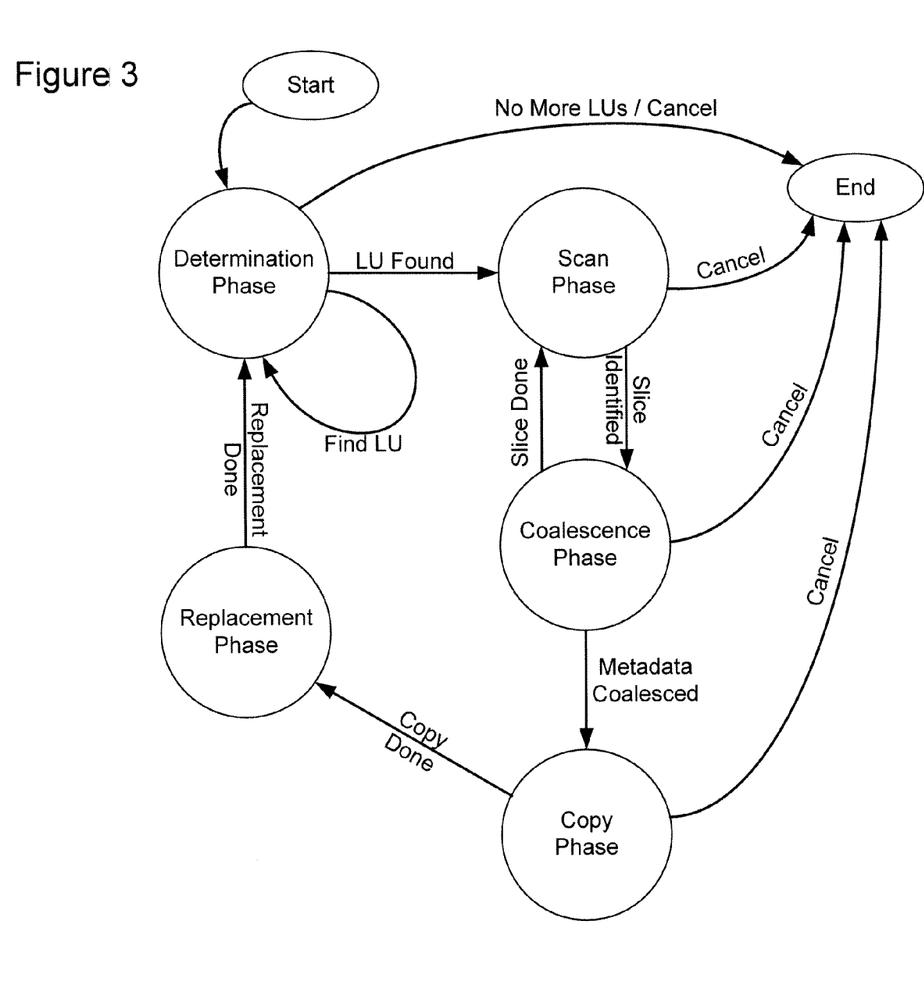
FIG. 3 shows a state diagram illustrating an exemplary method for timeline compression in accordance with an embodiment of the present disclosure.

Referring to FIG. 3, there is shown a state diagram illustrating an exemplary method for timeline compression in accordance with an embodiment of the present disclosure. The state diagram shows five phases in a timeline rollup operation. As mentioned above, the rollup operation may be preferably a thread running on or in coordination with a storage management system. Once started, the rollup thread may coalesce and/or re-organize backup data for a storage system by going through a Determination Phase, a Scan Phase, a Coalescence Phase, a Copy Phase, and a Replacement Phase.

In the Determination Phase, it may be determined what work needs to be done, such as, for example, what level of backup data to perform the rollup for and for which LU. A typical environment for implementation of a timeline compression may be a storage management system coupled to a storage system having a plurality of storage devices (e.g., LUs). One typical requirement for timeline compression involving multiple LUs is consistency of granularity levels of the timeline across all LUs. Accordingly, there may be a need to determine which level of backup data to roll up and which LU to start with. The level of backup data to perform the rollup for, also known as a "rollup level," may be determined based on rollup state data (described in detail below) that have been maintained for the LUs. In order to determine which LU to perform the rollup for, the LUs may be examined one at a time, typically by analyzing the rollup state data and/or other informational data associated with the LUs. For each LU, the oldest backup data in the timeline may be identified for the current rollup level. If, for example, the LU in question is owned by a local node for which the rollup thread is running, and if there are enough valid, sealed backup data for the time range in question (e.g., at least two data chunks), then the rollup operation may proceed to the next phase (i.e., Scan Phase). Otherwise, another LU may be chosen and analyzed. If no LU is found that meets the criteria defined in the TLP, then the rollup operation may end. If an LU is found that meets the criteria to perform a rollup, then all related LUs (e.g., those associated with the same quota group) may be rolled up as well. If it is determined that a rollup must occur, the rollup thread on other nodes may be awoken using a remote message.

In the Scan Phase, for backup data that can be rolled up, a scan of the metadata may be performed in order to identify the time period defined by the TLP and to retrieve relevant metadata. The scan may be a query of the metadata on a slice by slice basis in time order. According to embodiments of the present disclosure, each LU may be divided into a plurality of fixed-size logical partitions (e.g., 16 Gigabytes (GB) each) for ease of management and for load balancing purposes, wherein each fixed-size logical partition may be referred to as one "slice." When a slice has been scanned, the identified metadata may be coalesced in the Coalescence Phase, after which a next slice may be scanned in the Scan Phase. The slice by slice cycle may repeat until all slices have been exhausted for the LU and time period in question.

In the Coalescence Phase, the metadata that have been identified in the Scan Phase may be coalesced into fixed size allocation units. Coalescence of the metadata may be achieved in any of a variety of ways. According to one embodiment, the identified metadata may first be stored in memory in a time-ascending order according to their timestamps. Then, starting from the oldest metadata, the identified metadata may be inserted into a binary tree (B-tree) that is indexed by starting Logical Block Addresses (LBA's) recorded in the metadata. The B-tree may be first scanned for LBA overlap before the coalesced metadata are inserted. The newer COW data containing LBA overlaps may be discarded. Splits may also be done on COW data where needed to achieve coalescence. For example, for a particular time interval, if metadata for Blocks 1-5 are already stored in the B-tree, then another metadata row associated with Blocks 3-8 may be split into two portions, one associated with Blocks 3-5 and the other associated with Blocks 6-8, where the former may be discarded while the latter may be entered into the B-tree. The resulting metadata may be coalesced into relatively large fixed sized allocation units (e.g., 512 KB), each allocation unit representing a single COW operation. Statistics kept as records may be coalesced and inserted into the B-tree. These statistics may be kept on an LU basis so that a determination can be made in the Copy Phase as to whether to actually copy the COW data into a rollup chunk or simply modify the corresponding (coalesced) metadata. The statistics kept may include, for example, the number of original blocks, the number of duplicate blocks (block savings), the number of original COW operations, and the number of coalesced COW operations (metadata savings).

Each resulting metadata row may be that of the earliest original operation in a particular slice. For example, if Block 128 was written twice in a row, once at time T1 and again at time T2, the resulting coalesced metadata may only reflect the write operation at time T1. Once the metadata for a slice has been coalesced, the next slice may be processed for the same LU in the Scan Phase. This procedure continues until all slices for the LU have been processed, whereupon the Copy Phase may be executed.

In the Copy Phase, the coalesced metadata may be read from memory, and the COW data the coalesced metadata point to may be copied into rollup chunks. Whether or not to actually copy the COW data may depend on an evaluation of the statistics collected in the Coalescence Phase. General, an actual copy of the COW data is performed only when there is some saving of storage space.

After the evaluation has passed and all of the metadata have been coalesced for an LU, the COW data may be copied into resulting rollup chunks on a slice by slice basis. The COW data may be copied from a time store (in the storage management system) to the same time store using pre-allocated non-replicated buffers. In order to accomplish the data copy, an event chain may be created and a RollupTimeStoreMove event may be pushed onto the event chain. The RollupTimeStoreMove object may be derived from an SGIO and a WaitableEvent object and may be handled by an IO execution context. The event may have two extents, one for the read of the original COW data and one for the write to the rollup chunk in the time store. The Copy Phase may wait for the event to complete and then update an in-memory array with a data structure representing a new indexing operation. This array may be used in the Replacement Phase to update the coalesced metadata. Once all of the COW data have been copied, the rollup thread may proceed to the Replacement Phase.

In the Replacement Phase, the relevant portion of old COW data may be replaced with the newly created rollup chunks, the corresponding metadata may be replaced or modified to reflect the new chunks and coalesced COW data contained therein, and the rollup state may be updated. The Replacement Phase is typically carried out atomically and may be rolled back should a catastrophic failure event occur. The LU whose metadata are being updated may be locked to keep configuration from changing and to prevent timeline deprecation from occurring during this phase. The old COW data coalesced in the previous phases may be freed, and the new rollup chunks may be added to the appropriate place in the timeline. The original metadata may be deleted and replaced by the new, coalesced metadata. Finally, the LU may be unlocked, and a next LU that meets the Determination Phase criteria may be processed.

According to one embodiment, the old COW data may be transformed into new rollup chunks without an actual copy taking place. The original data chunks may simply be updated to reflect the rollup timestamps, and their rollup level may be updated accordingly.

The rollup operation runs through a number of phases one of which involves copying COW data to newly rolled-up chunks, which may take a significant amount of time. As a result, other critical components of the system that interfere with rollups or change the state of the timeline, such as Instant Restore, Time Images, or Timeline Deprecation, may cause an in-progress rollup to be canceled. If a rollup is canceled during processing of a particular level, all other levels may be cancelled as well. Therefore, in the state diagram shown in FIG. 3, there is a Cancel route from almost every phase to End. The Replacement Phase may not be arbitrarily cancelled and may proceed while the LU in question is locked. To avoid excessive interruption of the rollups, the timeline compression process may be preferably scheduled to start when resources in the storage system and/or the storage management system are in low demand.

It may be desirable to track the state of rollups that have occurred on an LU by LU basis. This way, other components in the storage system can determine what backup data have been rolled up, and what LUs have not yet had their backup data rolled up. For example, the determination of a common timeline start across multiple LUs requires rollup state information associated with the LUs of interest. The state of rollups may also be needed for future rollups in order to determine where to start a rollup.

The rollup state may be stored in a database table in a global database called "rollup state_," one example of which is shown in Table 1.

TABLE 1

Rollup State Table

| Field | Type | Description |
| --- | --- | --- |
| LU | Uint32 | Logical Unit (unique index) |
| GenerationNumber | Uint32 | Counter used to uniquely identify the rollup. |
| LastRollupLevel | Uint32 | The last rollup level that completed for this LU. |
| LastRollupRangeStart | Uint64 | The last start range time a rollup ran for this LU. |
| LastRollupRangeEnd | Uint64 | The last end range time a rollup ran for this LU. |

Each entry in Table 1 may have a generation number that uniquely identifies the rollup level for each LU. The generation number may be updated whenever a rollup is completed for an LU.

In addition to rollup state on an LU, each LU entry in the global database may have a field describing the last rollup level for it. This may be used to determine the timeline for an LU within a rollup level.

There may be cases where multiple rollups for the same rollup level and LU may exist in a same rollup chunk. In order to return valid image times for this case, a history of rollups that have taken place may be kept. The start and end time ranges for each rollup may be stored in a table called "rollup_history," one example of which is shown as Table 2.

TABLE 2

Rollup History Table.

| Field | Type | Description |
| --- | --- | --- |
| LU | Uint32 | Logical Unit |
| RollupLevel | Uint32 | The rollup level that completed for this LU. |
| RollupRangeStart | Uint64 | The start range time this rollup ran for this LU. |
| RollupRangeEnd | Uint64 | The end range time this rollup ran for this LU. |

This information may be used to determine valid image times for an LU and rollup level. Once a rollup level is rolled up (e.g. from Level-1 to Level-2) or a rollup level has been deprecated, the entry representing that particular rollup may be deleted.

Figure 4:
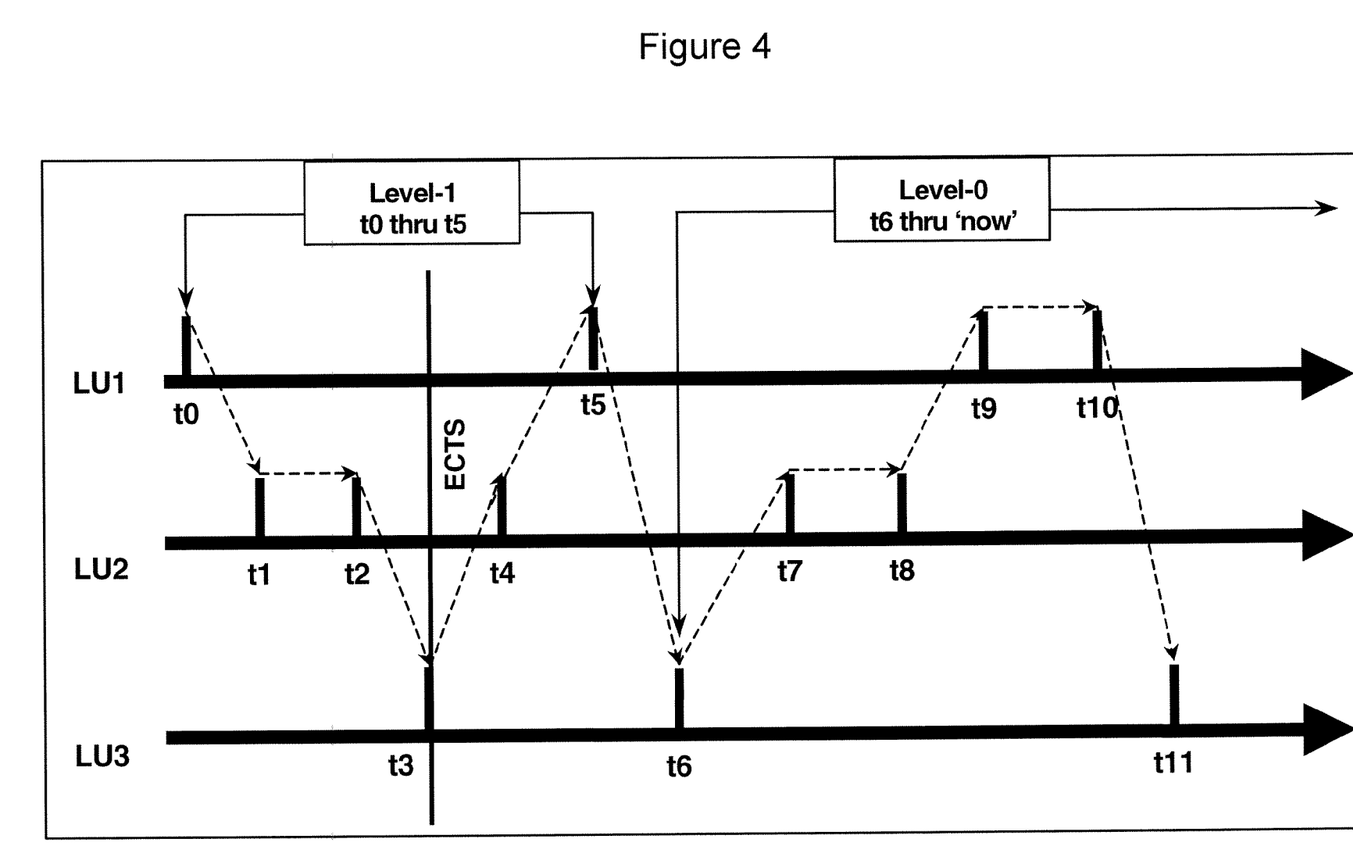
FIG. 4 shows an exemplary timeline for three related LUs in accordance with an embodiment of the present disclosure.

Since an LU is typically related to or grouped with other LUs, the result of a rollup on one LU may affect how the timeline for a group of LUs is represented. When a timeline rollup involves a group of LUs (e.g., in a dataset or quota group), the start of a timeline for the group of LUs may be the earliest common timeline start (ECTS) among all the LUs. However, when there are multiple levels of rollup data, there may be points in time in the timeline that become invalid for the start of an image time. FIG. 4 illustrates two different rollup levels across three related LUs. Each tick on the timelines may represent a data chunk in a time store. The start of the timeline for hourly data may be time t3 since it is the ECTS among the three LUs. In this example, valid image times are t3, t4, and t5 for the hourly data. The times t0, t1, and t2 can only be chosen through dissociation with the other related LUs. Since times t3, t4, and t5 are hourly buckets of backup data and are essentially single-point-in-time (SPIT) images, image times chosen in between these times may be invalid. The Level-0 data in this example runs from time t6 through a present time. Any Level-0 time between t6 and the present time may be valid image times.

Figure 5:
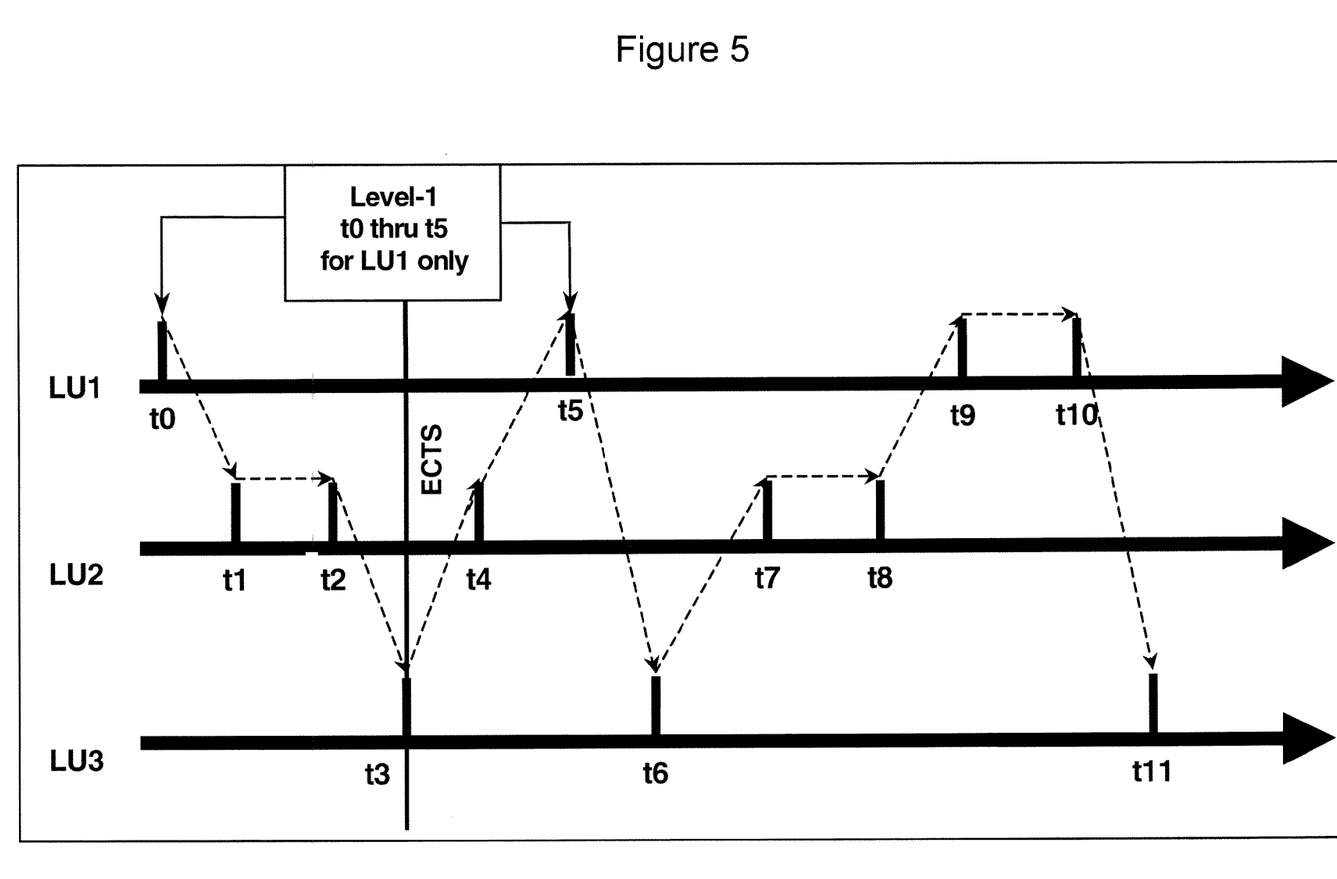
FIG. 5 shows another exemplary timeline for three related LUs in accordance with an embodiment of the present disclosure.

When rollup levels among multiple LUs are inconsistent, the valid image times may differ from those when the rollup levels are consistent among the LUs. If, in the above example, Level-1 rollup is only completed for LU-1, then points t3 and t4 may not be valid image times. FIG. 5 illustrates this scenario. Although the ECTS remains the same, t5 may be the only valid image time across all LUs for Level-1 data. Any image time between t6 and the present time may still be valid.

According to embodiments of the present disclosure, a few primitive application program interfaces (APIs) may be provided to represent a timeline that accommodates transient rollup inconsistencies. For example, primitive APIs may be provided to perform the following functions: (a) retrieve start and end of timeline for an LU across all rollup levels, wherein the start and end time range, as well as the generation number for the last rollup, may be returned for the LU; (b) retrieve start and end time of a timeline for an LU within each rollup level for an LU (e.g. start and end of Level-1 data for LU-1), wherein the start and end time range, as well as the generation number for the last rollup, may be returned for Level-0, Level-1, Level-2 and Level-3 data; (c) retrieve the next and previous image times based on an input image time for an LU, wherein the start time before and the start time after the image time may be returned for each of the two times. Using these primitive APIs, a user or client program that has knowledge about the relationship among the LUs may query the information for each LU and determine the start and end of the timeline for each level.

In the exemplary timeline shown in FIG. 4, the primitive APIs may be used to find the start and end of the Level-1 timeline for the related Lus as follows.
(1) The ECTS may be found for the set of LUs based on what the latest timeline start is for the set of LUs, in this case time t3.
(2) The Level-i data with earliest start time past the ECTS, in this case t5, may be the start of the Level-1 timeline.
(3) The Level-1 data with the latest end time past the ECTS, in this case t5, may be the end of the Level-1 timeline.
(4) All image times chosen between the start and end times may be validated by using API(c) above for each LU. Finding the closest time before and after the image time may yield up to two valid data points for an image time.

Similarly, the primitive APIs may be used to find the start of the Level-0 timeline for the related LUs in FIG. 4.
(1) The ECTS may be found for the set of LUs based on what the latest timeline start is for the set of LUs, in this case time t3.
(2) The Level-0 data with the earliest start time past the latest end time of the Level-1 data, in this case time t6, may be the start of the Level-0 timeline.
(3) Any image time from this point forward may be valid for Level-0 data.

For a Time Image or Instant Restore operation, an image time may be chosen in a two-stage process wherein the image time is validated (or confirmed) by each storage device before the requested Time Image or Instant Restore operation takes place. In that two-stage process, there may be a window of opportunity for a rollup to change the timeline in such a way that makes a chosen image time invalid. To close this window, the validation phase in that two-stage process may cancel a currently running rollup and prevent other rollups from running. In addition, if a rollup is in a state that cannot be canceled, then the validation phase may complete in error to force a new query of the timeline. Configuration events in the validate phase for Time Image and Instant Restore may also pass in the rollup generation number queried when the timeline was queried. If the generation number has changed since the query, the validation phase may also complete in error to force a new query of the timeline.

In a storage system, each quota group may have an allocated timeline storage space for rollup purposes. According to one embodiment, for example, the amount of storage provisioned may be based on the following formula:

(Maximum number of LUs in the storage system× Maximum number of rollup levels possible)+100 working chunks for doing a rollup.

In order to have an active Level-1, Level-2, and Level-3 rollup chunk for each LU, and to have 100 chunks for performing the active rollup, approximately 20 GB of storage space may be allocated as rollup quota per quota group.

There may not be enough space to accommodate a Copy Phase for a given rollup. This situation may be detected using statistics generated in the Coalescence Phase, and the rollup for that rollup level may be cut short. The rollup state information may then be updated to reflect that the rollup has not yet completed and the next LU chosen by the determination phase may be the same LU, so that the rollup may resume.

Rollup chunks may be essentially transformed into new COW data in the Replacement Phase. The old data chunks may be freed as they are replaced. The rollup quota may be updated to reflect changes in the amount of space used. This guarantees that a rollup does not cause a deprecation of timeline and that there is space for at least 100 rollup chunks available at the start of any given rollup.

When a rollup thread is woken on a node due to a deprecation of timeline or a threshold of the timeline storage capacity being crossed, the rollup thread on other nodes may be woken as well, so that LUs belonging to the same dataset may be processed. The mechanism used to awaken the remote thread may be a simple spread message.

Starting a capture mode, adding LUs to a capturing dataset, and removing LUs from a capturing dataset all have the same effect on rollup chunks as these events have on normal time store data chunks. Every capturing LU may have an active rollup chunk for every level configured in the TLP. When an LU has capture mode turned on a rollup chunk may be activated for each level configured.

Timeline deprecation typically involves discarding older backup data in a timeline once the timeline storage is approaching its quota. If a deprecation of timeline is about to take place, any rollup currently running may be immediately cancelled. When the deprecation is completed, another rollup may be immediately scheduled.

Rolled-up data may typically be deprecated first in the timeline since they may be the oldest data in the timeline. One anomaly in terms of deprecation may be that it is possible for an active rollup chunk to be deprecated. Multiple rollup chunks may contain duplicate start times, much like data chunks copied back during an Instant Restore. The same deprecation rules apply to these rollup chunks as do the copy back chunks. Rollup chunks with duplicate start times may be all deprecated regardless of how much space is needed.

Time images may be short lived entities. As a result, they may be deleted when deprecation of timeline takes place. One goal of timeline compression may be to avoid this deprecation of timeline based on the premise that backup data at a higher level of granularity may be better than no data at all. This being the case, there may be two options:

1. Let rollups behave the same way as deprecation behaves and delete the time image when a rollup runs into a time image.

2. Stop rollups when encountering a time image. The danger being that deprecation may delete the time image anyway.

A global option may be set up by a user to control how rollups behave when encountering a time image. For example, any time image creation may cancel a running rollup.

An instant restore may cause the state of a timeline to change drastically and quickly. As a result, an active rollup may be immediately canceled when an instant restore is initiated.

Much like time images, user-defined timeline annotations may be invalidated when timeline is deprecated. The same holds true for rollups.

On failover, any running rollup may be cancelled. Leftover data for rollups that may have been in progress on a remote node may be cleaned up by a surviving node. Rollup chunks may be scrubbed the same way COW data may be scrubbed on failover.

Figure 6:
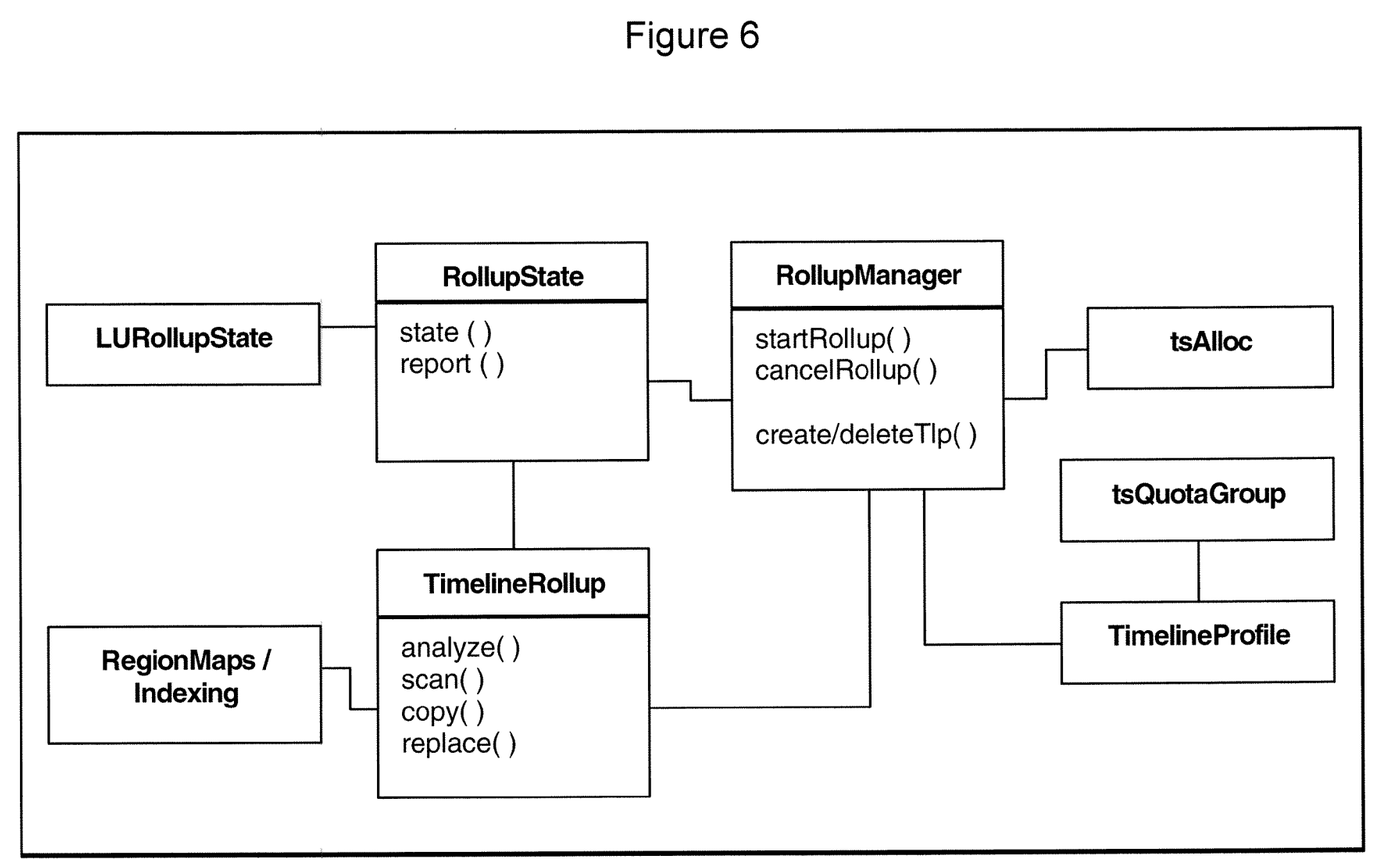
FIG. 6 shows major objects involved in an exemplary program for timeline compression in accordance with embodiments of the present disclosure.

FIG. 6 outlines major objects involved in an exemplary program for timeline compression in accordance with embodiments of the present disclosure. A RollupManager object may be an interface for starting, canceling, maintaining synchronization, and querying state for rollups. In addition, it may be responsible for maintaining TLP objects. The RollupManager may contain an instance of a TimelineRollup object. The TimelineRollup object may be an active object responsible for performing all phases of a rollup. There may also be an object called RollupState which may be an interface for querying and setting state for rollups. It may maintain transient states related to the rollup process as well as the persistent states for LUs which may be stored in a global database. A RegionMaps/Indexing object may be responsible for building B-trees as described above. A tsAlloc object may allocate time store cache for rollup chunks. A tsQuotaGroup object may allocate timeline storage space for a dataset. A TimelineProfile object may record a TLP for a dataset.

At this point it should be noted that the technique for timeline compression in accordance with the present disclosure as described above typically involves the processing of input data and the generation of output data to some extent. This input data processing and output data generation may be implemented in hardware or software. For example, specific electronic components may be employed in a storage area network (SAN) or similar or related circuitry for implementing the functions associated with timeline compression in accordance with the present disclosure as described above. Alternatively, one or more processors operating in accordance with stored instructions may implement the functions associated with timeline compression in accordance with the present disclosure as described above. If such is the case, it is within the scope of the present disclosure that such instructions may be stored on one or more processor readable media (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for timeline compression in a storage system, wherein digital content of the storage system is backed up to enable restoration of the digital content to one or more points in a timeline, the method comprising:
   selecting a time interval in the timeline;
   identifying one or more sets of backup data recorded for the selected time interval, wherein the identified one or more sets of backup data represent at least a portion of old data overwritten during the selected time interval; and
   discarding other backup data recorded for the selected time interval, thereby reducing a granularity level of the timeline in the selected time interval.

2. The method according to claim 1, wherein the digital content of the storage system is backed up through copy-on-write operations into a plurality of sets of copy-on-write data and corresponding metadata, and wherein the step of identifying further comprises identifying one or more sets of copy-on-write data and corresponding metadata recorded for the selected time interval.

3. The method according to claim 2, wherein a length of the time interval is selected based at least in part on a desired granularity level of the timeline.

4. The method according to claim 2, wherein the step of identifying further comprises:
   determining whether a storage unit in the storage system has been overwritten more than once during the selected time interval;
   if the storage unit has been overwritten once during the selected time interval causing a sole set of copy-on-write data and corresponding metadata to be recorded, selecting the sole set; and
   if the storage unit has been overwritten more than once during the selected time interval causing multiple sets of copy-on-write data and corresponding metadata to be recorded, selecting one of the multiple sets.

5. The method according to claim 4, wherein, if the storage unit has been overwritten more than once during the selected time interval, the selected set of copy-on-write data and corresponding metadata is the earliest set recorded for the selected time interval.

6. The method according to claim 2, further comprising:
   coalescing metadata in the one or more identified sets of copy-on-write data and corresponding metadata.

7. The method according to claim 6, further comprising:
   identifying copy-on-write data that correspond to the coalesced metadata; and
   replacing all sets of copy-on-write data and corresponding metadata previously recorded for the selected time interval with a new set comprising the identified copy-on-write data and the coalesced metadata.

8. The method according to claim 2, further comprising:
   selecting multiple time intervals in a portion of the timeline based on a desired granularity level for the portion of the timeline; and
   repeating the steps of identifying and discarding for the selected multiple time intervals.

9. The method according to claim 2, wherein the storage system comprises a plurality of storage devices, the method further comprising:

repeating the steps of identifying and discarding for one or more of the plurality of storage devices to cause the plurality of storage devices to have a consistent granularity level of the timeline with respect to one another.

10. The method according to claim 2, wherein the steps of selecting, identifying and discarding are triggered when one or more of the following conditions are met:

a predetermined storage capacity for the timeline has been consumed;

a predetermined amount of data have been accumulated for a granularity level of the timeline;

granularity levels of the timeline for at least two storage devices in the storage system are inconsistent;

an instruction to reduce the granularity of the timeline is received; and a scheduled time for reducing the granularity of the timeline is reached.

11. The method according to claim 2, further comprising:

scanning the storage system for a storage device for which the granularity of the timeline can be reduced.

12. At least one processor readable medium for storing a computer program of instructions configured to be readable by at least one processor for instructing the at least one processor to execute a computer process for performing the method as recited in claim 1.

13. A system for timeline compression in a storage system, wherein digital content of the storage system is backed up to enable restoration of the digital content to one or more points in a timeline, the system comprising:

means for selecting a time interval in the timeline;

means for identifying one or more sets of backup data recorded for the selected time interval, wherein the identified one or more sets of backup data represent at least a portion of old data overwritten during the selected time interval; and means for discarding other backup data recorded for the selected time interval, thereby reducing a granularity level of the timeline in the selected time interval.

14. A system for timeline compression in a storage system, wherein digital content of the storage system is backed up to enable restoration of the digital content to one or more points in a timeline, the system comprising:

a storage medium for storing instructions; and at least one processor for:

selecting a time interval in the timeline;

identifying one or more sets of backup data recorded for the selected time interval, wherein the identified one or more sets of backup data represent at least a portion of old data overwritten during the selected time interval; and discarding other backup data recorded for the selected time interval, thereby reducing a granularity level of the timeline in the selected time interval.

* * * * *